INVENTORS.
RICHARD H. JORDAN &
EMMOR V. SCHNEIDER
BY Woodling and Krost, attys.

INVENTORS.
RICHARD H. JORDAN &
EMMOR V. SCHNEIDER
BY
Woodling and Krost
attys.

Patented June 29, 1954

2,682,629

UNITED STATES PATENT OFFICE 2,682,629

POSITION CONTROL MEANS WITH INDICATOR

Richard H. Jordan, Mansfield, and Emmor V. Schneider, Alliance, Ohio, assignors to The Alliance Manufacturing Company, a corporation of Ohio Application November 1, 1950, Serial No. 193,416

15 Claims. (Cl. 318—31)

The invention relates in general to rotating devices and more particularly to rotating devices which have an indicator to indicate the desired position of a rotatable member.

An object of the invention is to provide an antenna rotator wherein a movable recessed member cooperates with a reference and step-by-step impulse means correlates the relative movement of the reference and the recessed member with the movement of the antenna.

Another object of the invention is to provide an antenna rotator wherein a movable stepping member moves relative to a reference and step-by-step impulse means, which includes the switch means, effects relative movement of the reference and the stepping member in accordance with the movement of the antenna.

Another object of the invention is to provide a rotator for rotating an antenna shaft by electrical drive means which is energized by energization means under control of a step-by-step impulse means which correlates the relative movement of a marker and a movable member with the movement of the antenna shaft.

Still another object of the invention is to provide a rotator for rotating an antenna shaft wherein switch means controls the energization of electrically controllable drive means for the antenna shaft and wherein the actuation of the switch means is correlated with the movement of a toothed member relative to a reference point.

Other objects and a fuller understanding of the invention may be had by referring to the following description and claims, taken in conjunction with the accompanying drawings, in which:

Figure 1:
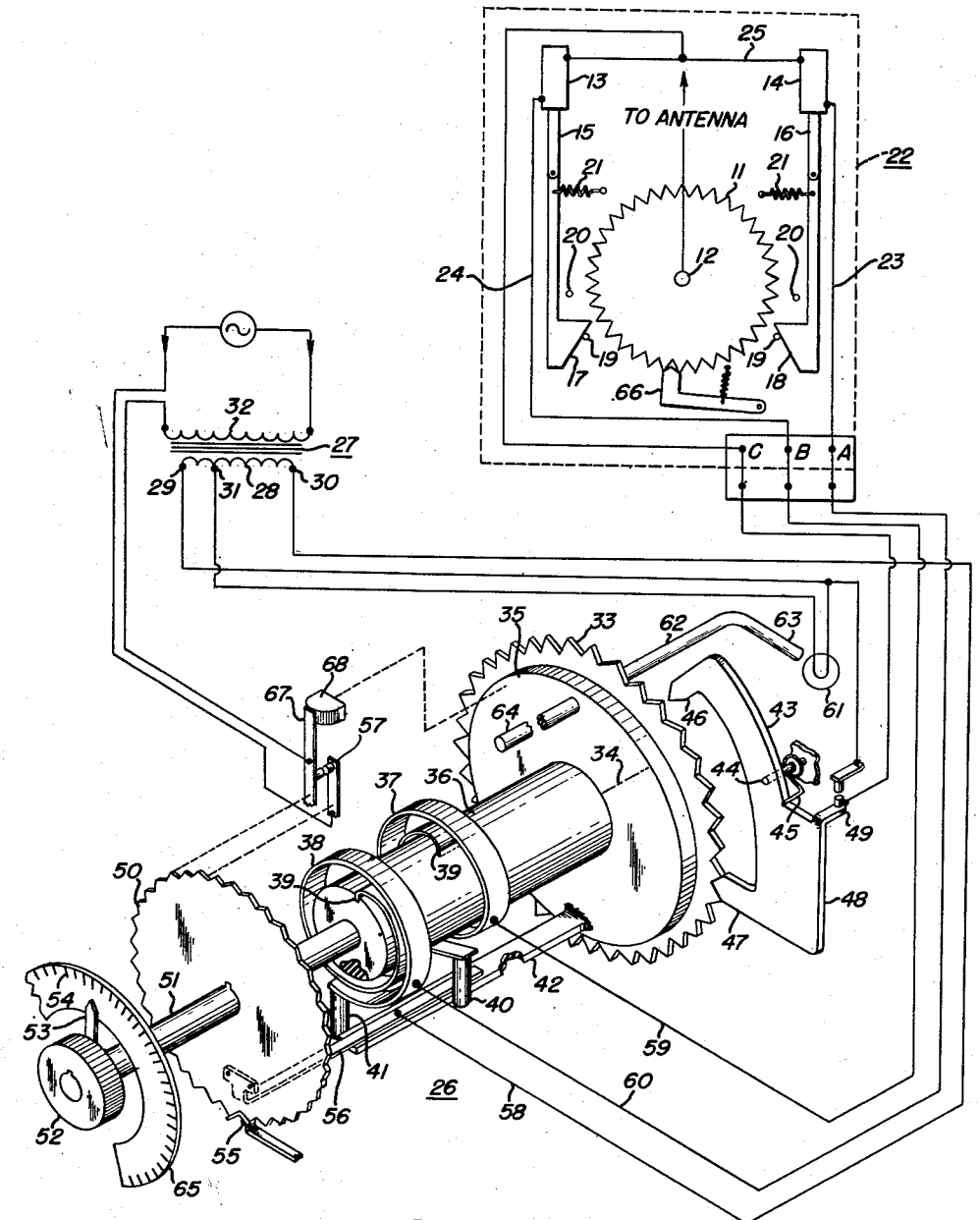
Figure 1 is an isometric view of the control mechanism for an antenna rotator which is shown in combined isometric and schematic form.

The antenna rotator of Figure 1 shows a ratchet wheel 11 which has the legend thereon that it is connected to the antenna for rotating the same. This ratchet wheel 11 is rotatable about a pivot 12 and may be rotated either clockwise or counterclockwise. A first solenoid 13 is provided for clockwise rotation and a second solenoid 14 is provided for counterclockwise rotation. The solenoids 13 and 14, respectively, axially actuate cores 15 and 16, which, respectively, act on pawls 17 and 18. First pins 19 are used to hold the pawls in a retracted position relative to the ratchet wheel 11 and second pins 20 are adapted to act as stops for the pawls upon being actuated by the solenoids 13 and 14. Springs 21 are used to urge the pawls 17 and 18 toward the ratchet wheel 11. The aforementioned mechanism is part of a rotator mechanism 22 shown by the dotted rectangle. The rotator mechanism 22 has a terminal box with control terminals A, B and C. The control terminal A is connected by a wire 23 to the lower end of the second solenoid 14 and the control terminal B is connected by a wire 24 to the lower end of the first solenoid 13. The upper ends of the two solenoids are joined together by a wire 25 and to the control terminal C.

A control mechanism 26 is shown in isometric view in the lower half of the Figure 1. This control mechanism 26 may be a mechanism remotely placed from the rotator mechanism 22. For instance, if the rotator is to be used with a television antenna the rotator mechanism 22 would be placed near and rotatively connected with the television antenna, whereas the control mechanism 26 would, for convenience, be placed near the television receiver. The control mechanism 26 includes a step-down transformer 27, the primary 32 of which is adapted to be connected to a suitable source of alternating current. A secondary 28 is provided on the transformer 27 having end terminals 29 and 30 and a tap 31.

An escapement wheel 33 having a toothed or serrated edge is revoluble about an axis shown by the dot-dash line 34. An insulator disk 35 is fastened to the escapement wheel 33. An insulator axle 36 is also fastened to the escapement wheel 33 and disk 35 for rotation therewith. The insulator axle 36 carries first and second coil springs 37 and 38 with first ends 39 thereof fastened to the insulator axle 36. The coil springs 37 and 38 are wound in opposite directions and have first and second outer ends 40 and 41, respectively. The outer ends 40 and 41 bear against and are held in position by an insulator bar 42 which is carried by the insulator disk 35. This insulator bar 42 extends parallel to but displaced from the axis 34. The springs 37 and 38 are slightly wound, and hence the fact that the outer ends 40 and 41 bear against the bar 42 prevents the unwinding of these springs.

An anchor verge 43 cooperates with the escapement wheel 33 and pivots about a pivot axis 44. A coil spring 45 urges the anchor verge 43 in a clockwise direction. The verge 43 has first and second pallets 46 and 47, respectively. The second pallet 47 is in engagement between two adjacent teeth on the wheel 33 and the first pallet 46 is substantially opposite the crest of a tooth. By this construction the verge 43 must rock to permit escapement of the escapement wheel 33. The verge 43 also preferably has a mass 48 to permit a longer period of vibration of this verge. A normally open secondary switch 49 is actuated to a closed position upon each timed rocking of the verge 43.

A detent wheel 50 is pivotal about the axis 34 and is carried by a shaft 51 which in turn is manually rotatable by a knob 52. The knob 52 carries a pointer 53 which may cooperate with indicia 54. A spring detent 55 cooperates with the indentations or teeth on the periphery of the detent wheel 50 to restrain this wheel from movement. A conductor bar 56 is fastened to and carried by the detent wheel 50 and extends rearwardly to lie parallel to the insulator bar 42. The conductor bar 56 is narrower than the insulator bar 42, and hence, in the position shown, touches neither of the outer ends 40 nor 41. The conductor bar 56 and outer ends 40 and 41 act as a double throw secondary switch. A primary switch 57 is connected in series with the transformer primary 32, and this switch is adapted to be actuated to an open condition when the escapement wheel 33 and detent wheel 50 are aligned in the position shown. This may be accomplished by the cam follower 67 carried by the detent wheel 50 and the cam 68 carried by the escapement wheel 33. Upon misalignment of the two wheels 33 and 50 the primary switch 57 will be actuated to a closed condition to energize the transformer 27. This primary switch 57 may have a construction, such as is shown in the copending application of R. H. Jordan, entitled "Rotator" and filed October 17, 1950, Serial No. 190,506.

A lead 58 is connected to the conductor bar 56 and this may be a flexible lead or it may take the form of a sliding contact. Leads 59 and 60 are connected to the first and second springs 37 and 38, respectively, and these leads also may be either flexible leads or a slip-ring type of connection. The leads 59 and 60 are connected to the control terminals B and A, respectively, and the lead 58 is connected to the end terminal 30 of the transformer 27. A pilot light 61 is connected between the tap 31 and end terminal 29, and this pilot light 61 is mounted on the axis 34. A light transmitting rod or light pipe 62 has a first end 63 disposed near the pilot light 61 and a second end 64 disposed near and cooperating with the indicia 54. For this purpose, the indicia 54 may be marks on a translucent scale 65 so that the light transmitting rod 62 may produce a spot of light on this translucent scale. The secondary switch 49 is connected in circuit between the end terminal 29 of the transformer and the control terminal C.

*Operation of Figure 1*

In the position shown in Figure 1, the antenna rotator is adjusted with the pointer 53 being aligned with the end 64 of the light transmitting rod 62. In this condition the primary switch 57 is opened by cam action, between the cam follower 67 and cam 68, and hence a transformer 27 is de-energized. The secondary switch 49 is in an open condition since the pallet 47 is disposed between two adjacent teeth on the escapement wheel 33. Further the conductor bar is out of contact with both spring ends 40 and 41, and hence no electrical contact is made between this conductor bar 46 and either of the springs 37 or 38. If an operator moves the knob 52 on notch clockwise, as determined by the detent 55, this movement will turn the pointer 53 and detent wheel 50. Such movement will close the primary switch 57 and will cause the conductor bar 56 to electrically contact the outer end 41 of the coil spring 38. A transformer 27 will be energized, and the pilot light 61 will be illuminated. A spot of light thrown by the end 64 of the rod 62 will thus appear on the translucent scale 65 to indicate the instantaneous position of the antenna. The clockwise movement of the conductor bar 56 will cause it to bear against the outer end 41 of the coil spring 38. This will slightly compress this coil spring 38 and the torque thereof will exceed the torque of the coil spring 37 to thus urge the escapement wheel 33 in a clockwise direction. This clockwise torque on the wheel 33 will cause a cam action between the teeth thereof and the pallet 47 to thus rock the verge 43 against the urging of the coil spring 45. Since the conductor bar 56 is in electrical contact with the coil spring 38, and because the secondary switch 49 is momentarily closed, there will be a closed electrical circuit from the transformer secondary 28 to the solenoid 14. This circuit will extend from the end terminal 30 through the lead 58, the coil spring 38, the lead 60, the lead 23, the solenoid 14, the lead 25, the secondary switch 49 and return to the end terminal 29 of the secondary 28. The energization of the solenoid 14 will cause the pawl 18 to move the ratchet wheel 11 by one tooth. The ratchet wheel 11 has been shown as turning in a counterclockwise direction; however, this could easily be made to be a clockwise direction. The clockwise movement of the escapement wheel 33 carries with it the light transmitting rod 62 so that the end 64 is again aligned with the pointer 53. With realignment of these two members the primary switch 57 is again aligned to cause opening of this switch by the cam follower 67 and cam 68. This opening de-energizes the transformer 27 to de-energize both the rotator mechanism 22 and the control mechanism 26.

The knob 52 may also be rotated in a counterclockwise direction. Rotation of the knob 52 may be any number of teeth on the detent wheel 50; however, for practical purposes a physical stop is provided for both the knob 52 and ratchet wheel 11. This stop may provide physical rotation of these two elements by slightly more than 360 degrees. If the knob 52 is rotated ten teeth on wheel 50 in a counterclockwise direction the conductor bar 56 will engage the outer end 40 of the coil spring 37 to wind up this spring. The torque created by this spring will tend to rotate the escapement wheel 33 also in a counterclockwise direction. Misalignment of the wheels 50 and 33 will cause energization of the transformer 27 and the tendency toward counterclockwise rotation of the escapement wheel 33 will cause a timed rocking of the verge 43. This will intermittently actuate to a closed condition the secondary switch 49. Due to the switch action of the conductor bar 56 with the outer end 40 and the intermittent closing of the switch 49, the solenoid 13 will be operated ten times to rotate the ratchet wheel 11 by ten teeth. In many cases, the detent wheel 50 may have less than a 360-degree rotation for a full 360-degree rotation of the wheel 11. If so the number of active teeth on this detent wheel 50 are less than the number shown. To facilitate physical construction, the escapement wheel 33 may be designed to rotate through a smaller angle than does the ratchet wheel 11. The desired number of positions, in which the antenna rotator can stop, determines the number of active teeth on the ratchet wheel 50 and also the minimum number of teeth on the ratchet wheel 11. The relative number of teeth on the escapement wheel 33 and on the ratchet wheel 11 must be such that the latter receives the proper number of impulses to turn the antenna rotator through the desired angle. Also the angular spacing of the teeth on the detent wheel 50 must be the same as or an integral multiple of the angular spacing of the teeth on the escapement wheel 33. A detent 66 may be provided to hold the ratchet wheel 11 restrained against movement so that wind action on the television antenna will not turn the ratchet wheel 11.

Figure 2:
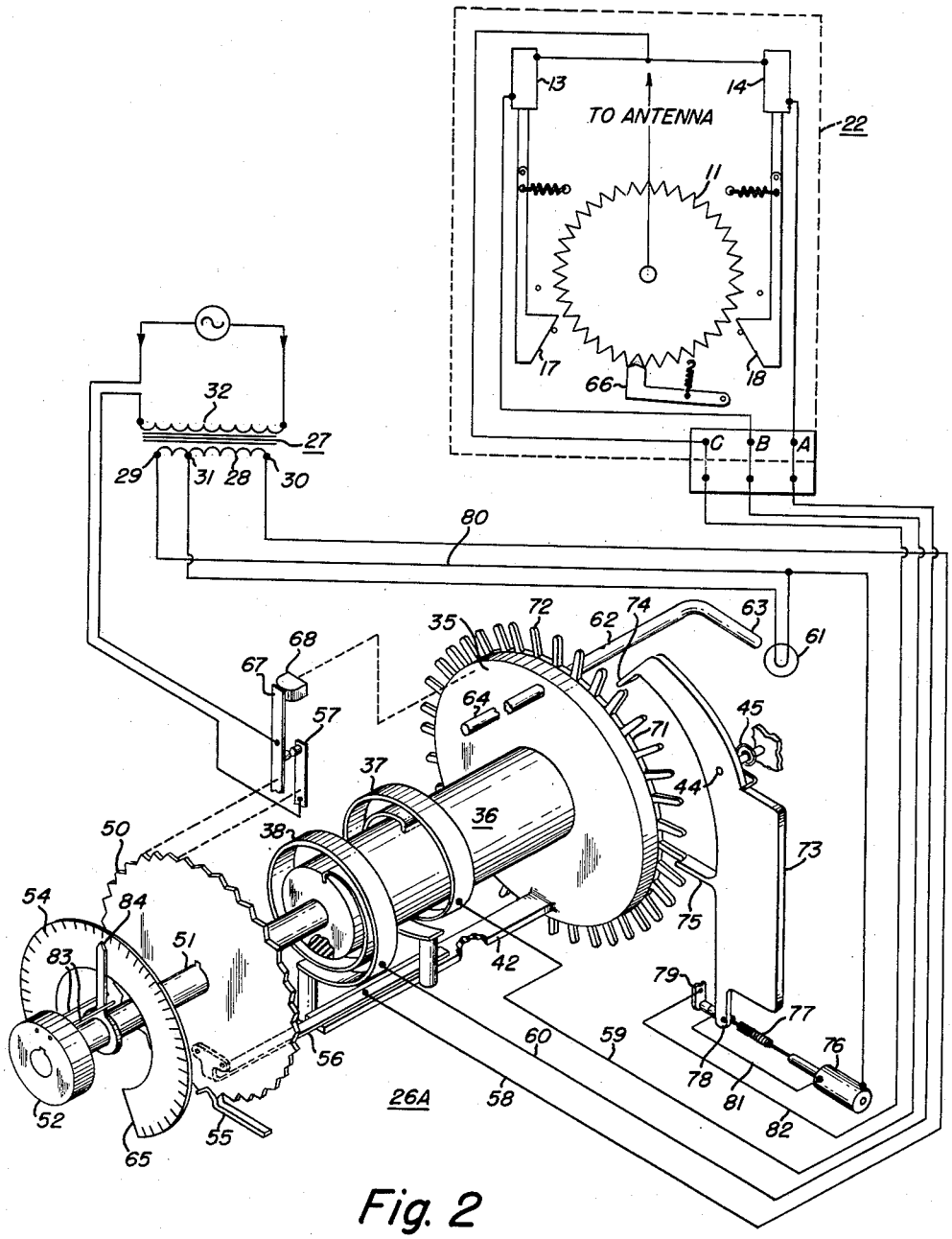
Figure 2 is a modified form of an antenna rotator also shown in combination schematic and isometric manner.

The Figure 2 shows a modification of the antenna rotator wherein the rotator mechanism 22 may be the same as that shown in Figure 1. The control mechanism 26A is somewhat different from the control mechanism 26 of Figure 1. The control mechanism 26A includes an escapement wheel 71 which is fastened to the insulator disk 35 and axle 36. The escapement wheel 71 has teeth 72 which have radially extending sides. An anchor verge 73 rockingly cooperates with the escapement wheel 71 and this verge 73 has first and second pallets 74 and 75. The pallet 75 is shown in engagement with one of the teeth 72 and the pallet 74 is out of engagement with these teeth. A control solenoid 76 is connected through a spring 77 to the lower end 78 of this verge 73. The lower end 78 also carries the verge switch 79 which is in a closed condition with the verge 73 in the position shown. A lead 80 connects the second terminal 29 of the secondary 28 to the solenoid 76, a lead 81 connects the solenoid 76 to the verge switch 79, and a lead 82 connects this switch to the control terminal C. The distance between adjacent teeth 72 is greater than the thickness of the pallets 74 or 75, and hence there is a lost motion between the pallet 75 and the teeth of the escapement wheel 71. This lost motion connection will be about 6 to 8 degrees.

The knob 52 carries two rods 83 which lie on either side of a pointer 84. The pointer 84 is somewhat loosely journaled on the shaft 51 and is moved only when the rods 83 abut this pointer 84. The distance between the rods 83 is greater than the width of the pointer 84, and hence there is a lost motion therebetween of about 10 degrees to compensate for the lost motion of the pallet 75 relative to the teeth on the escapement wheel 71.

*Operation of the Figure 2*

The antenna rotator of Figure 2 operates in somewhat similar fashion to the rotator of Figure 1. The knob 52 may be turned to move the pointer 84 to any desired location. Thus, the movement of the pointer 84 relative to the scale 54 will show the desired location of the antenna. Misalignment of the pointer 84 and light pipe 64 will close the primary switch 57 to energize the system. The conductor bar 56 will electrically contact one of the springs 37 and 38 whenever the pointer 84 and light pipe 64 are misaligned. Therefore, the electrical current will energize either the solenoid 13 or the solenoid 14 to intermittently rotate the ratchet wheel 11, and also to energize the control solenoid 76 since these solenoids are in series. The coil spring 77 has been used in order that the force of the control solenoid 76 will not immediately open the verge switch 79; rather, this switch will stay closed long enough to permit the solenoid 13 or 14 to move the ratchet wheel 11 by one tooth. After such movement of the ratchet wheel 11 the force of the control solenoid 76 will rock the verge 73, and hence open the verge switch 79. Rocking of the verge 73 permits escapement of the escapement wheel 71 by one tooth. The intermittent movement of the wheel 11 and the wheel 71 continues until the light pipe 64 and pointer 84 are realigned.

If the knob 52 is turned one notch, as determined by the detent 55, in the opposite direction from that in which it was formerly moved, then the pallet 75 will be urged against the next adjacent tooth. This will mean that the escapement wheel 71 will have rotated about 6 degrees, which is the lost motion between the pallet 75 and the teeth of the escapement wheel 71. The detent wheel 50 will have turned 10 degrees, assuming that there are 36 teeth on this detent wheel 50, as well as on the escapement wheel 71. The difference between the 6 degrees and 10 degrees rotations will mean that the wheels 50 and 71 are misaligned by about 4 degrees from their former relative positions. This 4 degrees misalignment will be insufficient to cause the cams 67 and 68 to close the primary switch 57. Thus, the transformer 27 is not energized. Because of this lost motion in the escapement wheel 71 there has been provided a like lost motion between the knob 52 and the pointer 84. This is so that movement of one notch in the opposite direction of rotation from that in which the knob was formerly moved will not cause an erroneous indication of the pointer 84 relative to the scale 54.

Figure 3:
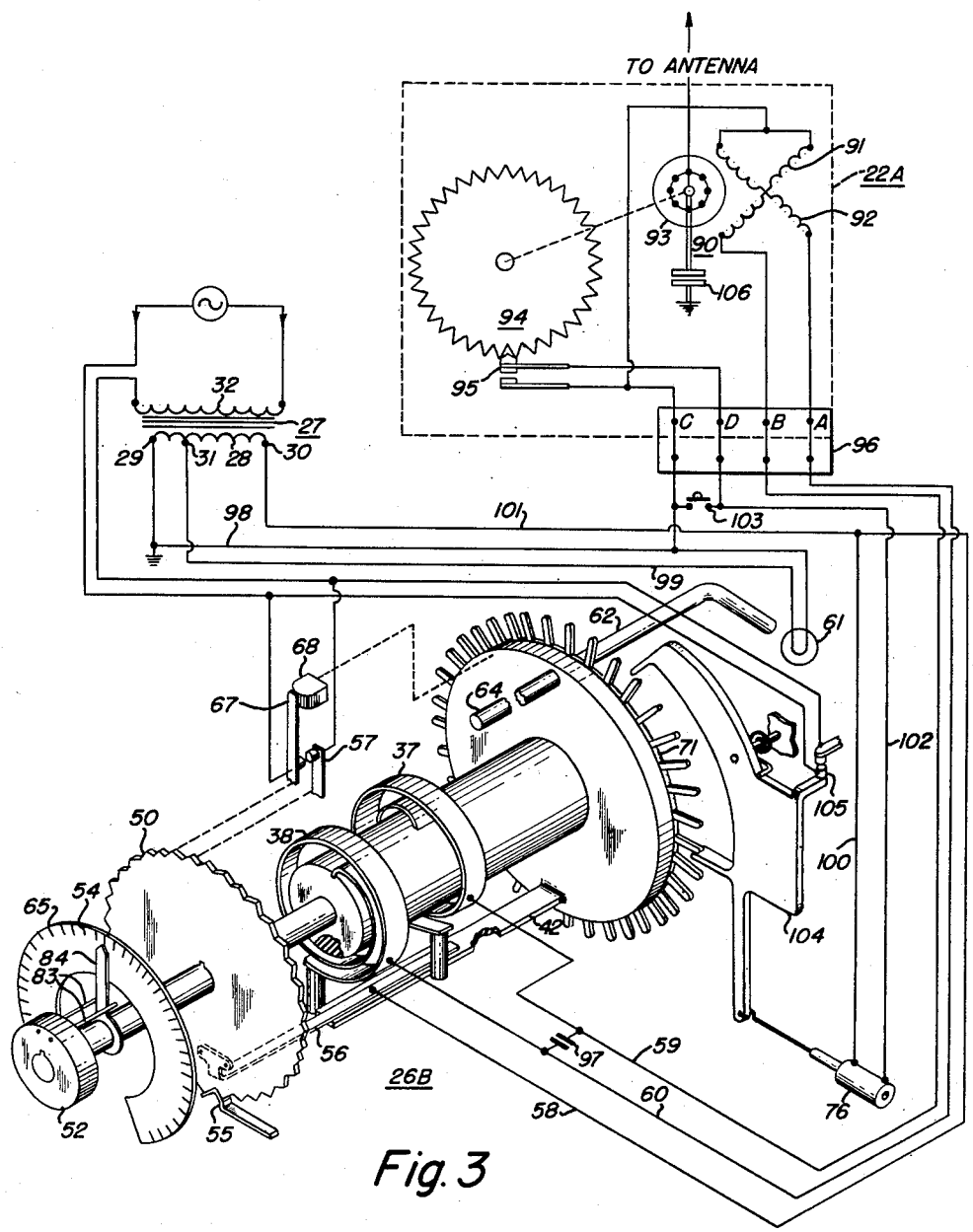
Figures 3, 4, 5 and 6 are further modifications of the invention also shown in combination schematic and isometric manner.

The Figure 3 is a further modification of an antenna rotator. A rotator assembly 22A is shown by a dotted rectangle. This rotator mechanism includes a reversible capacitor-induction motor 90 having first and second running windings 91 and 92 and a rotor 93. The rotor 93 drives a cam 94 which intermittently actuates impulsing switch 95. The rotator mechanism 22A also includes a terminal strip 96 with terminals A, B, C and D.

A control mechanism 26B is provided in the system of Figure 3, and this control mechanism has an escapement wheel 71 similar to that shown in Figure 2. The spring motors 37 and 38 and conductor bar 56 are also provided. A condenser 97 is connected between the leads 59 and 60 to cooperate with the motor 90. This provides that when current is supplied to the lead 59, and hence to the running winding 91, then a phase displaced current will be supplied to the lead 60, and hence to the running winding 92. This provides rotation of the rotor 93 in a given direction.

The transformer 27 is again provided with the secondary 28. End terminal 29 is connected to ground and is connected by a lead 98 to the terminal C on the terminal strip 96. The pilot light 61 is also connected to this lead 98 and by a lead 99 to the tap 31. The control solenoid 76 is connected by leads 100 and 101 to the end terminal 30 and is also connected by the lead 102 to the control terminal D. The leads 58 and 101 connect the conductor bar 56 to the end terminal 30.

A manual switch 103 is connected across the control terminals C and D. The control solenoid 76 directly actuates an anchor verge 104. The verge 104 cooperates with the escapement wheel 71 in the same manner as for the system of Figure 2. The verge 104 actuates a synchronizing switch 105 which is connected in parallel with the primary switch 57. A friction brake 106 is provided for the rotor 93 and this friction brake may preferably be of the spring actuated type which is released by the axial movement of the rotor 93 whenever the magnetic forces tend to pull the rotor into alignment with the stator of this motor 90.

*Operation of Figure 3*

The system is adjusted so that the pointer 84 is aligned with the light pipe 62 when the system is at rest. Misalignment of the light pipe 62 and pointer 84 will close the primary switch 57 to energize the transformer 27. This misalignment will also directly energize either the running winding 91 or the running winding 92 through the coil spring 37 or 38. The rotor 93 of the motor 90 will thus turn to turn the antenna. The cam 94 will also rotate to intermittently actuate the impulsing switch 95. Such actuation will intermittently energize the control solenoid 76 which will rock the verge 104. Since one of the coil springs 37 or 38 is wound tighter than the other the escapement wheel 71 will rotate in order to equalize the tension in these two springs. The stepped rotation of the escapement wheel 71 will be in the proper direction to cause the light pipe 62 to again realign with the pointer 84.

The synchronizing switch 105 has been provided as a safety measure to prevent any additional impulses being submitted to the control solenoid 76 which would cause the antenna and the light pipe 62 to get out of step. It will be seen that for a given number of notches, the detent wheel 50 is rotated relative to the detent 55, the control solenoid 76 must have the same number of electrical impulses in order to cause this escapement wheel 71 to realign with the detent wheel 50. If the knob 52 has been rotated clockwise five notches, for example, and then before the escapement wheel 71 has again caused realignment, this knob 52 should be turned more than five notches counterclockwise, momentarily, the wheels 50 and 71 will be realigned which will cause momentary opening of the primary switch 57. If at this moment, the impulsing switch 95 is closed, then an electrical impulse would be transmitted to the control solenoid 76 were the synchronizing switch 105 not provided. Such extra impulse would cause the escapement wheel 71 to be one step ahead of the antenna. To prevent such added or extra impulses the synchronizing switch 105 has been provided. This synchronizing switch 105 is in parallel with the primary switch 57 and is adapted to be actuated to a closed condition whenever the control solenoid 76 is energized. This provides that whenever the impulsing switch 95 is closed, there can be no extra impulse transmitted to the control solenoid 76 even though the primary switch 57 is opened and then closed again.

The manual switch 103 has been provided across the control terminals C and D as a convenience feature should the system ever become out of synchronism. The system may become out of synchronism by an extra impulse imparted to the control solenoid 76 should the alternating current power be momentarily interrupted. The rotor 93 is preferably adapted to rotate the antenna approximately 360 degrees and to have a physical stop. The physical stop would provide the end of rotation limits and these, of course, should coincide with the end of rotation limits of the light pipe 62 relative to the scale 65. If the pointer 84 is rotated alternately to the two rotational limits, and if the system is out of synchronism, then at one of these rotational limits the antenna rotator mechanism 22A will reach its physical stop before the light pipe 62 reaches the end index mark 54 on the scale 65. Since the physical stop prevents rotation of the cam 94 the impulsing switch 95 cannot continue to actuate the control solenoid 76. Thus, the spot of light on the translucent scale 65 will not go out and it will be stationary one or more units from the end position. In this case the manual switch 103 may be intermittently actuated, which will intermittently energize the control solenoid 76. This will again permit synchronism between the escapement wheel 71 and the antenna. The friction brake 106 has been provided to prevent coasting of the rotor 93 which might otherwise permit an extra actuation of the impulsing switch 95.

Figure 4:
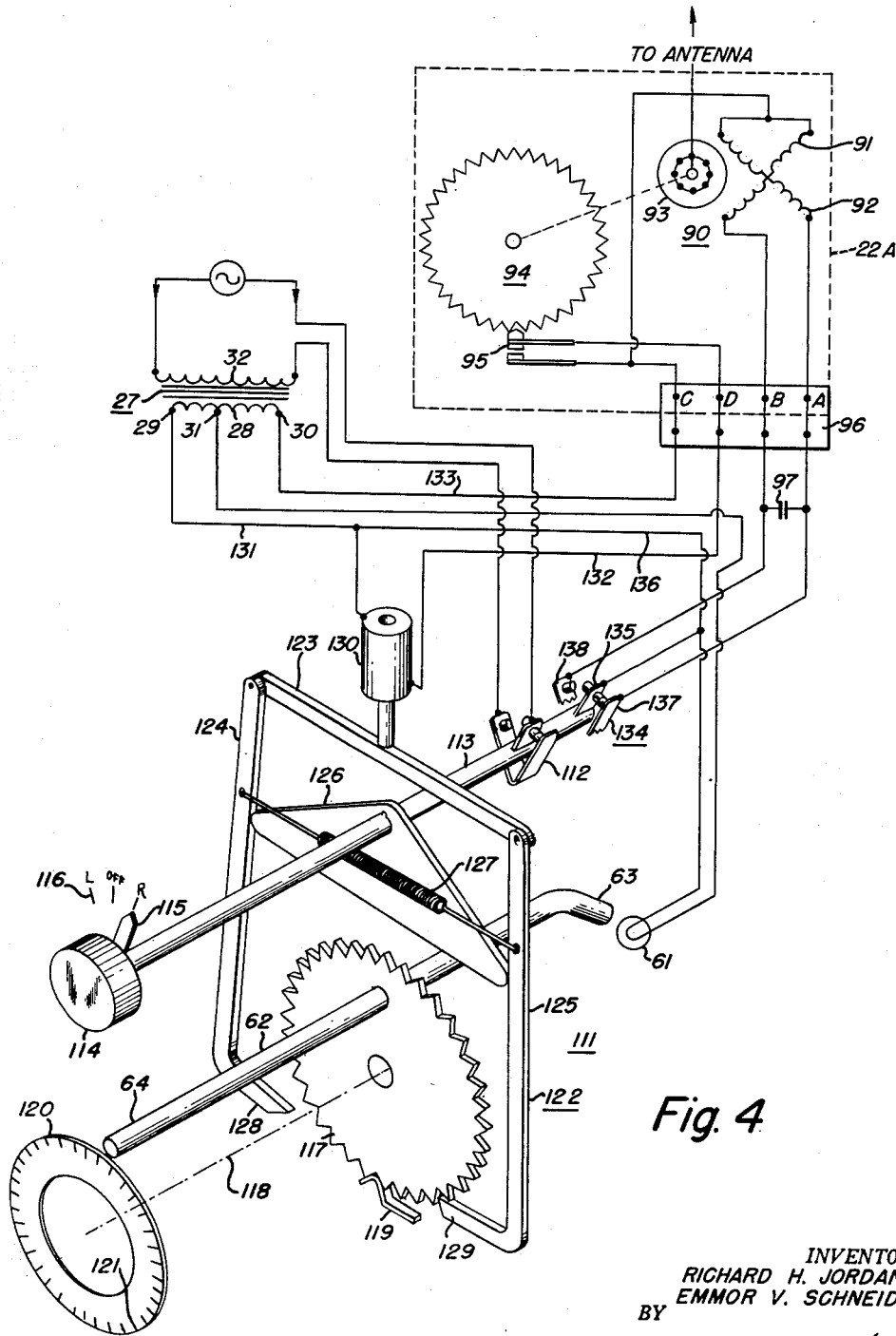

The circuit of Figure 4 shows a further modification of an antenna rotator. Such antenna rotator includes the rotator mechanism 22A and a control mechanism 111. The rotator mechanism 22A may be the same as that for the circuit of Figure 3. The control mechanism 111 includes the transformer 27 wherein the secondary 28 thereof supplies energy to this control mechanism 111. The transformer 27 has a primary 32 and a primary switch 112. The primary switch is a double throw switch controlled by the partial rotation of a shaft 113. The shaft 113 is shown as being rotatable by a knob 114 which has fastened thereto a pointer 115. Indicia 116 is marked as "L" for left, "R" for right and an off position. The pointer 115 is shown as being at the "R" or right position.

A ratchet wheel 117 is rotatable about an axis 118 and is restrained against rotation by a detent 119. The ratchet wheel 117 carries a light pipe 62 to be rotatable therewith wherein the first end 63 thereof is disposed adjacent a pilot light 61 which is located on the axis 118. The forward end 64 of the light pipe 62 cooperates with a translucent scale 120. The scale 120 may have indicia 121 thereon.

The ratchet wheel 117 is adapted to be rotated in either or two directions, and mechanical pawl means 122 is provided for such selected rotation. The mechanical pawl means 122 includes a yoke 123 and first and second arms 124 and 125. A triangular plate 126 is fixedly carried by the shaft 113 and is partially rotatable therewith. An extension spring 127 joins the arms 124 and 125 to urge these members together. The arms 124 and 125 have pawls 128 and 129, respectively, for selective engagement with the ratchet wheel 117 in accordance with the position of the triangular plate 126.

A control solenoid 130 is connected to the yoke 123 for vertical movement thereof. The control solenoid 130 is connected to the end terminal 29 of the secondary 28 by a lead 131 and is connected to the control terminal D by a lead 132. The control terminal C is connected to the end terminal 30 by a lead 133. The pilot light 61 is connected across the end terminal 29 and the tap 31. A double throw selector switch 134 is provided on the shaft 113 and includes a center contact 135 connected to the end terminal 29 by the leads 136 and 131. The opposing contacts 137 and 138 of the selector switch 134 are connected to the control terminals A and B, respectively.

Operation of Figure 4

The knob 114 is normally biased to the center or off position. The pointer 115 of the knob 114 has been shown in the right position as though it were being manually held in position. With the pointer 115 in the right position, the shaft 113 is turned and the triangular plate 126 is also slightly turned to move leftwardly the arm 124, and hence disengage the pawl 128 relative to the ratchet wheel 117. This movement also permits the arm 125 to move leftwardly toward the ratchet wheel so that the pawl 129 may cooperate with this ratchet wheel. Clockwise rotation of the shaft 113 also closes the primary switch 112, and it will be noted that this primary switch may be closed by either a clockwise or a counterclockwise partial rotation of the shaft 113. The closing of the primary switch 112 energizes the transformer 27 which lights the pilot light 61 and hence a spot of light through the light tube 62 will appear through the translucent scale 120 and cooperate with the indicia 121 thereon to show the present location of the antenna. The selector switch 134 is also closed on the contact 137 and hence an electrical circuit is closed through the running winding 92 of the motor 90. Because of the condenser 97 and running winding 91 the rotator 93 will rotate in a given direction. Such rotation will drive the cam 94 to intermittently close the impulsing switch 95. Such intermittent closing will intermittently energize the control solenoid 130. For each such energization the yoke 123 will be raised vertically, and hence the pawl 129 will move the ratchet wheel 117 by one tooth as determined by the detent 119. The spot of light from the light pipe 62 will thus teppingly move along the translucent scale 120. Such movement will continue until the knob 114 is released to the off position or until the physical stop on the antenna rotator mechanism 22A is reached.

Turning the knob 114 to the left position will disengage the pawl 129 relative to the ratchet wheel 117 and cause the pawl 128 to be in engagement therewith. Because of the closing of the primary switch 112 and the selector switch 134 at contact 138, the rotor 93 will turn in the opposite direction to that formerly described, and the ratchet wheel 117 will be intermittently moved in a clockwise direction by the pawl 128.

Figure 5:
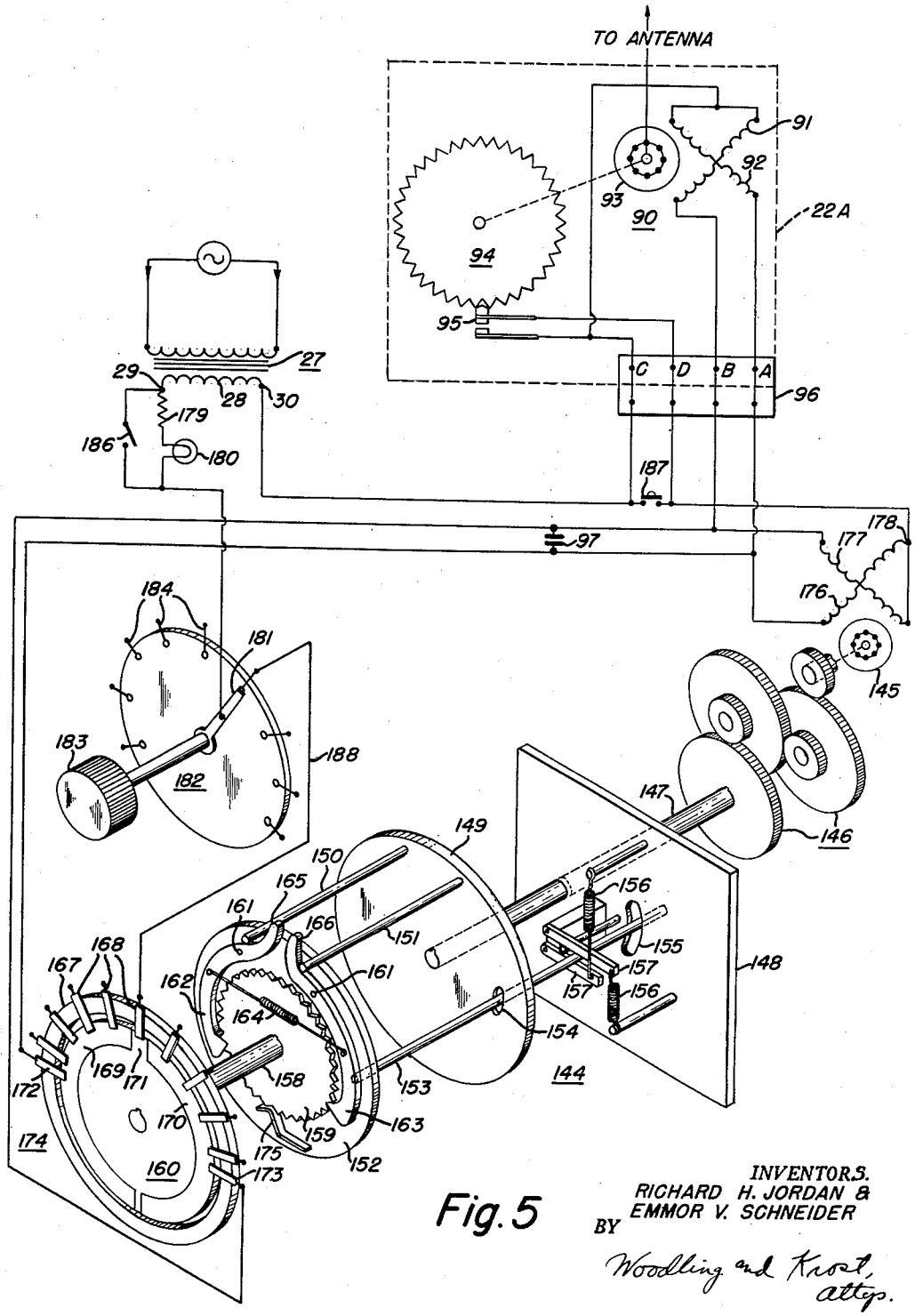

The Figure 5 shows a further form of antenna rotator wherein a rotator mechanism 22A is again employed which may be the same as that shown for the Figures 3 and 4. A transformer 27 is again employed for supplying power to the entire system. The system of Figure 5 includes a control mechanism 144 which includes an impulsing motor 145. This motor has been shown as a capacitor-induction type of motor the same as the motor 90. The motor 145 drives a speed reducing gear train 146 which has no worm gear therein so that it is capable of power input from either end of this gear train. The gear train 146 drives a shaft 147 which is journaled in a plate 148. The shaft 147 drives a drive disk 149 which carries first and second rods 150 and 151. The rods 150 and 151 lie adjacent a ratchet plate 152. The ratchet plate 152 is partially revoluble about the axis of the shaft 147. A drive pin 153 is carried by the ratchet plate 152 and extends through an arcuate aperture 154 in the drive disk 149 and further extends through a second arcuate aperture 155 in the plate 148. The aperture 155 is shown as having a greater arc than the aperture 154. The drive pin 153 is substantially centered in the aperture 155 by spring 156 which act through spring arms 157.

A second shaft 158 is axially aligned with the shaft 147 and has fastened thereto a ratchet wheel 159 and a switch plate 160 of a motor driven switch 174. Pivoted to the ratchet plate 152 at 161 are pawls 162 and 163. These pawls are urged into engagement with the teeth of the ratchet wheel 159 by the spring 164. Upper ends 165 and 166 are provided on the pawls 162 and 163, respectively, for engagement by the rods 150 and 151, respectively. A detent 175 restrains movement of the ratchet wheel 159. An insulator ring 167 is part of the motor driven switch 174 and carries a plurality of contacts 168 which are adapted to make contact with first and second semicircular contacts 169 and 170. The contacts 169 and 170 are separated by an insulator gap 171 wider than one of the contacts 168. End contacts 172 and 173 are provided on the insulator ring 167 and are connected, respectively, to the control terminals A and B on the terminal strip 96. The condenser 97 is connected across these control terminals and running windings 176 and 177 of the impulsing motor 145 are also connected to these control terminals A and B, respectively. The common junction 178 of the running windings 176 and 177 is connected to the control terminal D, and hence through the impulsing switch 95 to the end terminal 30 of the secondary 28. The end terminal 29 is connected through a resistor 179 and a pilot light 180 to the movable contact 181 of a selector switch 182. The movable contact 181 may be rotated by a selector knob 183. The selector switch 182 has a plurality of contacts 184 which have been shown here as nine in number, with each of these contacts 184 connected to one of the contacts 168 on the insulator ring 167. To avoid confusion in the drawing of Figure 5, only one lead 188 has been shown as connecting one of the contacts 184 with one of the contacts 168. It will be understood, however, that the other eight contacts on the selector switch 182 are electrically connected to the other eight contacts 168 on the ring 167 of the motor driven switch 174. A manual switch 186 is connected in parallel with the series combination of the resistor 179 and the pilot light 180. A second manual switch 187 is connected between the control terminals C and D within the control mechanism 144.

Operation of Figure 5

With the knob 183 in the position shown, the movable contact 181 is in contact with a particular contact 184 which is electrically connected by the lead 188 to a contact 168 which is at the insulator gap 171. Thus, the system is open circuited. If the movable contact 181 is moved to any of the other contacts 184 the electrical connection will be made from the secondary 28 to one or the other of the semicircular contacts 169 or 170. Let us assume that electrical connection is made with the semicircular contact 169. Current then flows through the end contact 172 to both the motors 90 and 145. For the time being, let us assume that the manual switch 186 is closed. The electrical power supplied to the motor 90 will, of course, cause rotation thereof to rotate the cam 94 and intermittently actuate the impulsing switch 95. When this switch is closed, a closed circuit will be effected through the impulsing motor 145 which will cause a selected rotation of this motor. The motor 145 drives, through the gear train 146, the shaft 147 and the drive disk 149. Let us assume that this drive disk is rotated in a clockwise direction for a total of 15 degrees. The rod 150 engages the upper end 165 of the pawl 162 to disengage this pawl relative to the teeth of the ratchet wheel 159. This occurs in the first 5 degrees of movement. Further clockwise movement of the drive disk 149 causes engagement between the upper end of the arcuate aperture 154 and the drive pin 153. The drive disk 149 still has 10 degrees of movement remaining. This 10 degrees of movement will move the ratchet plate 152 by 10 degrees, at which time the drive pin 153 will abut the lower end of the arcuate aperture 155 in the plate 148 to stall the motor 145. The length of time for this 15-degree movement of the drive disk 149 is less than the time that the impulsing switch 95 is closed. This is so adjusted that the drive pin 153 will have time to abut the lower end of the aperture 155 before this impulsing switch 95 is opened.

The 10-degree clockwise rotational movement of the ratchet plate 152 will permit the pawl 163 to slip over the next adjacent tooth in the ratchet wheel 159, which is held by the detent 175. During this 10-degree movement, the pawl 162 has been held in a disengaged position by the rod 150. The torque of the motor 145 exerted on the drive pin 153 has been exerted against the urging of the upper of the springs 156. When the impulsing switch 95 is opened by further rotation of the cam 94 the motor 145 is deenergized, and hence the upper spring 156 may then exert its force to turn the motor 145 in the opposite direction to that effected when it was energized. The upper spring 156 urges the drive pin 153 upwardly through about a 10-degree arc, and the pawl 163 thus ratchets the ratchet wheel 159 through this 10-degree arc in a counterclockwise direction. The inertia of the parts are preferably related such that the drive pin is again approximately centered in both the apertures 154 and 155; however, this centering is not necessary since on the next impulse, the mechanism will take care of any eccentricity in the linkage mechanism.

The intermittent closing of the impulsing switch 95 will continue and the intermittent or stepped rotation of the ratchet wheel 159 will continue until the switch plate 160 is rotated to a position wherein the insulator gap 171 cooperates with the particular contact 168 which electrically coincides with the selected one of the contacts 184 on the selector switch 182. At this point the electrical circuit is broken and the system is de-energized. It will be obvious that the contacts 184 and contacts 168 need not be connected in any prescribed order; rather, they may be considerably scrambled. A novel feature of the invention is that this scrambled connection between the contacts 184 and 168 permits any desired orientation of the antenna for the orientations of the movable contact 181. In the other rotators described previously the orientation of positions of the antenna must correspond with the orientation of the positions of the selector mechanism, such as the pointers 53 or 84. Because of this flexibility, the selector switch 182 and/or the selector knob 183 may be operated in accordance with the channel selector switch on a television set. In other words, the selector switch 182 can be built into the television receiver, and whenever a new television channel is selected the movable contact 181 will be cooperating with another one of the contacts 184. This will cause the antenna to be oriented to a new location which has been previously selected as the best position for receiving the signal of that particular television broadcasting station.

The manual switch 186 has been provided as a means to help ascertain that the unit is in synchronism. When the movable contact 181 is moved to a position other than one in alignment with the insulator gap 171 the pilot light 180 will go on since there is a closed circuit. However, the voltage dropping resistor 179 prevents enough voltage being applied to the motors 90 and 145 for rotation thereof. By the lighting of the pilot light 180 the operator is given an indication that the antenna rotator system is ready to be placed in operation. When the manual switch 186 is closed, then the motor 90 will rotate and the system will operate as previously described. If the manual switch 186 is opened before the system has again realigned itself the pilot light will go on, thus giving an indication of incomplete realignment. When realignment has been completed, opening of the manual switch 186 will not cause the pilot light 180 to be illuminated, thus giving an indication of completed realignment. If for some reason the antenna has become out of step relative to the position of the ratchet wheel 159 and this antenna should reach one of its physical rotational limits which prevent further movement of the cam 94, then the process of realignment cannot be effected. In this event the pilot light 180 will never be extinguished upon opening of the manual switch 186. Therefore, the operator will have an indication that the system is out of alignment. In such case, the manual switch 186 should be held closed and the second manual switch 187 should be intermittently closed to ratchet the ratchet wheel 159 still further in the desired direction. This will then establish realignment and the antenna will again be correctly oriented relative to the ratchet wheel 159.

Figure 6:
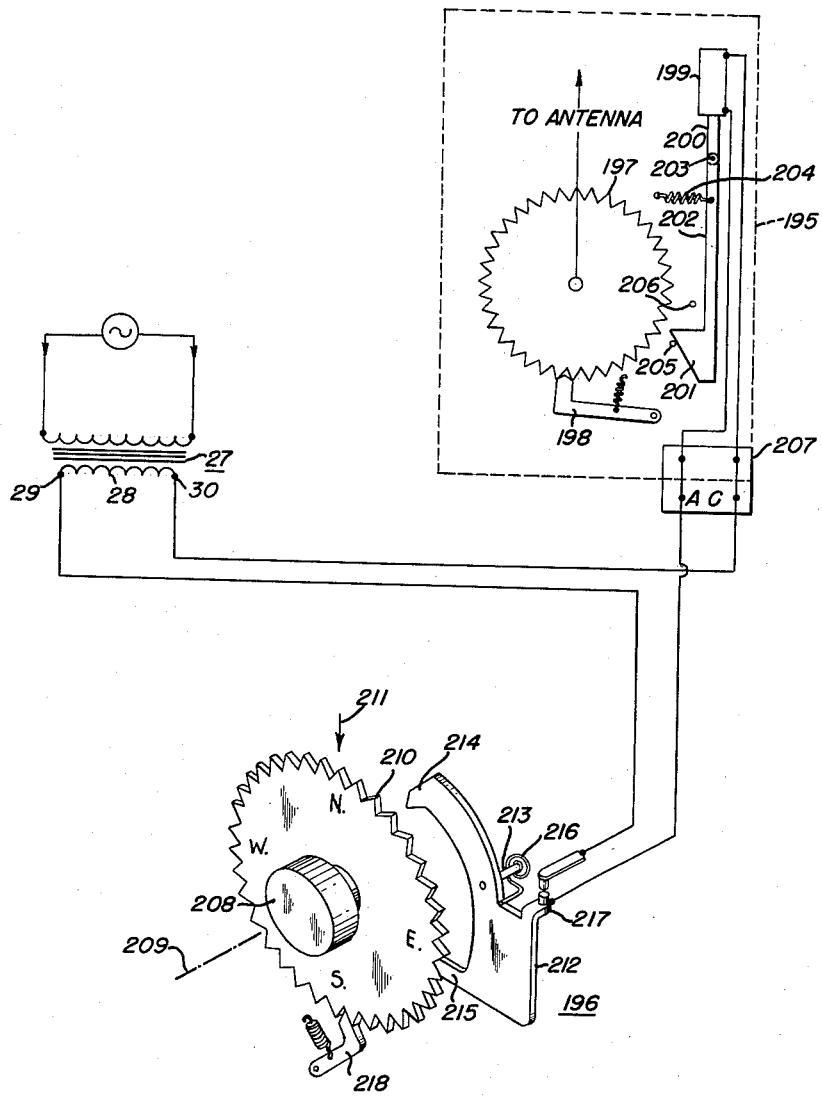

The Figure 6 is a further modification of a system for rotating an antenna which includes a rotator mechanism 195 and a control mechanism 196. The control mechanism 196 also includes the transformer 27 for energizing the entire system. The rotator mechanism 195 includes a ratchet wheel 197 which is shown as being operatively connected to an antenna for the rotation of same. A detent 198 cooperates with the ratchet wheel 197 to restrain movement of this ratchet wheel. A ratchet solenoid 199 has an axially sliding core 200 which acts on a pawl 201 through an arm 202. The core 200 is pivoted to the arm 202 at 203 and a spring 204 urges the arm 202 toward the ratchet wheel 197. A pin 205 causes disengagement of the pawl 201 and the ratchet wheel 197 when the ratchet solenoid 199 is de-energized, and a stop pin 206 is provided to limit the upward movement of the pawl 201. The rotator mechanism 195 also includes a terminal strip 207 having control terminals A and C.

The control mechanism 196 includes a knob 208 rotatable about an axis 209. Fixedly attached to the knob 208 is a ratchet wheel 210 to rotate therewith. The ratchet wheel 210 is shown as including indicia, the letters N, E, S and W indicating the compass points. An arrow 211 is an index point for cooperating with this indicia.

An anchor verge 212 pivots at 213 and has first and second pallets 214 and 215. The second pallet 215 is shown as being in engagement with the teeth of the ratchet wheel 210. This is caused by the urging of a verge spring 216. A verge switch 217 is actuable by the verge 212 and is shown as being in a normally open position due to the urging of the spring 216. The secondary 28 is connected to the control terminals A and C through the verge switch 217. A spring urged detent 218 is provided to cooperate with the ratchet wheel 210 to permit only counterclockwise rotation thereof.

*Operation of Figure 6*

The knob 208 may be manually rotatable in only a counterclockwise direction, and in so doing the ratchet wheel 210 is also so rotated. To permit rotation of this ratchet wheel 210 the verge 212 must rock back and forth in order to permit escapement of the teeth on the wheel 210 relative to the pallets 214 and 215. It will be observed that the V-shaped teeth on the ratchet wheel 210 will cooperate with the V-shaped pallets 214 and 215 to provide a camming action which will rock the verge 212. As the verge 212 rocks, the verge switch 217 will intermittently open and close and this will provide intermittent energization of the ratchet solenoid 199. The pawl 201 will thus cause a stepped rotation of the ratchet wheel 197, and hence the antenna will be rotated in a step-by-step movement. Since the ratchet wheel 210 can only be rotated in accordance with the rocking or oscillatory movement of the verge 212 the positions of the ratchet wheel 210 relative to the detent 218 will always be in correspondence with the position of the ratchet wheel 197 relative to the detent 198.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An antenna rotator for rotating an antenna shaft relative to a support, comprising, electrical drive means for rotating said antenna shaft relative to said support, energization means for said electrical drive means, and first and second circuit means, said first circuit means interconnecting said energization means and said electrical drive means and including, switch means having a first movable member and a power driven second member alignable with said first member whereby alignment of said members deenergizes said first circuit means and misalignment of said members energizes said first circuit means, said second circuit means including an interrupting switch actuated by said electrical drive means, power means for driving said motor driven switch, connection means for connecting said power means and said interrupting switch in series, and connection means for connecting said series combination in parallel with said electrical drive means, said power means including, an electric motor, a reversible input power train, a ratchet mounting plate at least partially rotatable and driven through said reversible input power train by said electric motor, a ratchet wheel journaled coaxially with said ratchet mounting plate, a detent cooperating with said ratchet wheel, a ratchet lever pivotally mounted to said ratchet mounting plate and having a tooth engageable with said ratchet wheel for effecting unidirectional stepped movements of said ratchet wheel, spring means urging the tooth of said ratchet lever into engagement with said ratchet wheel, a drive pin on said ratchet mounting plate, stationary abutment means limiting movement in one direction of said drive pin, an actuating lever pivotally positioned to engage one side of said drive pin, a stop pin disposed adjacent said lever and said abutment means, spring means urging said lever toward said pins, and means for coupling said power driven second member to said ratchet wheel.

2. A remote control system for rotating a shaft relative to a support, comprising drive means for rotating said shaft relative to said support, energization means, switch means connected to said drive means and having a first movable member and a power driven second member alignable with said first member whereby misalignment of said members effects rotation of said shaft by said drive means, power means for driving said power driven second member including a ratchet member, a ratchet lever having a tooth engageable with said ratchet member, a power unit movably acting on said ratchet lever to movably actuate said ratchet member in accordance with the rotation of said shaft, physical means for coupling said ratchet member to said power driven second member to drive same from said ratchet member, contact means carried on said second member, a first plurality of spaced electrical contacts mounted to be contacted by said contact means, a second plurality of spaced electrical contacts mounted to be contacted by said first movable member, a plurality of conductors interconnecting contacts of said first plurality with contacts of said second plurality, and circuit means connecting said energization means to said power unit and to said switch means.

3. A remote control system for rotating a shaft relative to a support, comprising drive means for rotating said shaft relative to said support, energization means for said drive means, and first and second circuit means, said first circuit means interconnecting said energization means and said electrical drive means and including, means having a first movable member and a power driven second member alignable with said first member whereby alignment of said members de-energizes said first circuit means and misalignment of said members energizes said drive means, said second circuit means including an interrupting means actuated by said drive means, power means for driving said power driven second member, and connection means for connecting said power means and said interrupting means to said energization means, said power means including a ratchet member, a ratchet lever having a tooth engageable with said ratchet member for movement thereof, a power unit acting on said ratchet lever to actuate said ratchet member in accordance with the rotation of said drive means, physical means for coupling said power driven second member to said ratchet member, electrical contact means insulatively carried on said second member, a first plurality of spaced electrical contacts mounted to be contacted by said contact means, a second plurality of spaced electrical contacts mounted to be selectably contacted by said first movable member, and a plurality of conductors interconnecting contacts of said first plurality with contacts of said second plurality.

4. A remote control system for rotating a shaft relative to a support, comprising electrical drive means for rotating said shaft relative to said support, energization means for said electrical drive means, and first and second circuit means, said first circuit means interconnecting said energization means and said electrical drive means and including, switch means having a first movable member and a power driven second member electrically alignable with said first member whereby alignment of said members de-energizes said first circuit means and misalignment of said members causes rotation of said electrical drive means, said second circuit means including power means for driving said power driven switch member, and connection means for connecting said power means to said energization means, said power means including a movable ratchet member, a ratchet lever having a tooth engageable with said ratchet member for movement thereof, electromagnetic means acting on said ratchet lever to actuate said ratchet member in accordance with the rotation of said drive means, physical means for coupling said power driven second member to said ratchet member, contact means insulatively carried on said second member, a first plurality of spaced electrical contacts mounted to be contacted by said contact means, a second plurality of spaced electrical contacts mounted to be contacted by said first movable member of said switch means, and a plurality of conductors interconnecting the contacts of said first plurality with the contacts of said second plurality.

5. A remote control system for rotating a shaft relative to a support, comprising reversible electrical drive means for rotating said shaft relative to said support, energization means for said electrical drive means, and first and second circuit means, said first circuit means interconnecting said energization means and said electrical drive means and including, double throw switch means having a double throw first movable member and a power driven second member alignable with said first member whereby alignment of said members de-energizes said first circuit means and misalignment of said members in a first direction energizes said electrical drive means in a first sense and misalignment of said members in the opposite direction energizes said electrical drive means in the opposite sense, said second circuit means including an interrupting switch actuated by said electrical drive means, reversible power means for driving said power driven switch member in both directions, and connection means for connecting said power means and said interrupting switch to said energization means, said reversible power means including a ratchet member, first and second ratchet levers each having a tooth engageable with said ratchet member for movement thereof in opposite directions, reversible electromagnetic means selectably acting on said first and second ratchet levers to steppingly ratchet said ratchet member in accordance with the selected rotation of said reversible drive means, physical means for coupling said power driven second member to said ratchet member, first and second spaced electrical contact means insulatively carried on said second member, a first plurality of spaced electrical contacts mounted to be contacted by said spaced contact means, the space between said spaced contact means being greater than the width of one of said plurality of contacts, a second plurality of spaced electrical contacts mounted to be selectably contacted by said first movable member of said switch means, and a plurality of conductors interconnecting the contacts of said first plurality with the contacts of said second plurality.

6. A remote control system for rotating a shaft relative to a support, comprising electrical drive means for rotating said shaft relative to said support, energization means for said electrical drive means, and first and second circuit means, said first circuit means interconnecting said energization means and said electrical drive means and including, multiple position switch means having a first rotatable member and a power driven second member electrically alignable with said first member whereby alignment of said members de-energizes said first circuit means and misalignment of said members energizes said electrical drive means, said second circuit means including an interrupting switch actuated by said electrical drive means, power means for driving said power driven second member, connection means for connecting said power means and said interrupting switch in series, and connection means for connecting said series combination to said energization means, said power means including a revoluble ratchet wheel, a ratchet lever having a tooth engageable with said ratchet wheel for rotation thereof in one direction, spring means urging said tooth into engagement with said ratchet wheel, electromagnetic means acting on said ratchet lever to steppingly ratchet said ratchet wheel in accordance with the rotation of said drive means, physical means for coupling said power driven second member to said ratchet wheel, an arcuate electrical contact insulatively carried on said second member, a first plurality of spaced electrical contacts mounted to be contacted by said arcuate contact, a second plurality of spaced electrical contacts mounted to be selectably and individually contacted by said first rotatable member of said switch means, and a plurality of conductors interconnecting each of the contacts of said first plurality with a different contact of said second plurality.

7. A remote control system for rotating a shaft relative to a support, comprising reversible electrical drive means for rotating said shaft relative to said support, energization means for said electrical drive means, and first and second circuit means, said first circuit means interconnecting said energization means and said electrical drive means and including, multiple position switch means having a first rotatable member and a power driven second member electrically alignable with said first member whereby alignment of said members de-energizes said first circuit means and misalignment of said members in a first direction rotates said electrical drive means in a first direction and misalignment of said members in the opposite direction rotates said electrical drive means in the opposite direction, said second circuit means including an interrupting switch actuated by said electrical drive means, reversible power means for driving said power driven switch member in both directions, connection means for connecting said power means and said interrupting switch in series, and connection means for connecting said series combination to said energization means, said reversible power means including a revoluble ratchet wheel, first and second ratchet levers each having a tooth engageable with said ratchet wheel for rotation thereof in opposite directions, spring means urging the tooth of each of said ratchet levers into engagement with said ratchet wheel, reversible electromagnetic means selectably acting on said first and second ratchet levers to steppingly ratchet said ratchet wheel in accordance with the selected rotation of said reversible drive means, physical means for coupling said power driven second member to said ratchet wheel, first and second arcuate spaced electrical contacts insulatively carried on said second member, a first plurality of spaced electrical contacts mounted to be contacted by said arcuate contacts, the space between said arcuate contacts being greater than the width of any one of said plurality of contacts, a second plurality of spaced electrical contacts mounted to be selectably and individually contacted by said first rotatable member of said switch means, and a plurality of conductors interconnecting each of the contacts of said first plurality with a different contact of said second plurality.

8. A remote control system for rotating a shaft relative to a support, comprising, electrical drive means for rotating said shaft relative to said support, energization means for said electrical drive means, and first and second circuit means, said first circuit means interconnecting said energization means and said electrical drive means and including, switch means having a first movable member and a power driven second member alignable with said first member whereby alignment of said members de-energizes said first circuit means and misalignment of said members energizes said first circuit means, said second circuit means including an interrupting switch actuated by said electrical drive means, power means for driving said power driven second member, and connection means for connecting said power means and said interrupting switch with said electrical drive means, said power means including, an electric motor, a power train, a ratchet wheel journaled for rotation, means for coupling said power driven second member to said ratchet wheel, a ratchet lever pivotally mounted and having a tooth engageable with said ratchet wheel, and means driven by said power train to move said ratchet lever for effecting unidirectional stepped movements of said ratchet wheel.

9. A remote control system for rotating a shaft relative to a support, comprising, electrical drive means for rotating said shaft relative to said support, energization means for said electrical drive means, and first and second circuit means, said first circuit means interconnecting said energization means and said electrical drive means and including, switch means having a first movable member and a power driven second member alignable with said first member whereby alignment of said members de-energizes said first circuit means and misalignment of said members energizes said first circuit means, said second circuit means including an interrupting switch actuated by said electrical drive means, power means for driving said power driven switch member, connection means for connecting said power means and said interrupting switch in series, and connection means for connecting said series combination in parallel with said electrical drive means, said power means including, an electric motor, a power train, a ratchet wheel journaled for rotation, a ratchet lever pivotally mounted and having a tooth engageable with said ratchet wheel for effecting unidirectional stepped movements of said ratchet wheel, spring means urging the tooth of said ratchet lever into engagement with said ratchet wheel, a drive pin driven by said power train, stationary abutment means limiting movement in one direction of said drive pin, an actuating lever pivotally positioned to engage one side of said drive pin, a stop pin disposed adjacent said lever and said abutment means, spring means urging said lever toward said pins, and means for coupling said power driven second member to said ratchet wheel.

10. A remote control system for rotating a shaft relative to a support, comprising, electrical drive means for rotating said shaft relative to said support, energization means for said electrical drive means, and first and second circuit means, said first circuit means interconnecting said energization means and said electrical drive means and including, switch means having a first movable member and a power driven second member alignable with said first member whereby alignment of said members de-energizes said first circuit means and misalignment of said members energizes said first circuit means, said second circuit means including an interrupting switch actuated by said electrical drive means, power means for driving said power driven switch member, connection means for connecting said power means and said interrupting switch in series, and connection means for connecting said series combination in parallel with said electrical drive means, said power means including, an electric motor, a power train, a ratchet mounting plate at least partially rotatable and driven through said power train by said electric motor, a ratchet wheel journaled coaxially with said ratchet mounting plate, a detent cooperating with said ratchet wheel, a ratchet lever pivotally mounted to said ratchet mounting plate and having a tooth engageable with said ratchet wheel for effecting unidirectional stepped movements of said ratchet wheel, spring means urging the tooth of said ratchet lever into engagement with said ratchet wheel, a drive pin on said ratchet mounting plate, stationary abutment means limiting movement in one direction of said drive pin, an actuating lever pivotally positioned to engage one side of said drive pin, a stop pin disposed adjacent said lever and said abutment means, spring means urging said lever toward said pins, and means for coupling said power driven second member to said ratchet wheel.

11. A remote control system for rotating a shaft relative to a support, comprising, reversible electrical drive means for rotating said shaft relative to said support, energization means for said electrical drive means, and first and second circuit means, said first circuit means interconnecting said energization means and said electrical drive means and including, double throw switch means having a double throw first movable member and a power driven second member alignable with said first member whereby alignment of said members de-energizes said first circuit means and misalignment of said members in a first direction energizes said electrical drive means in a first sense and misalignment of said members in the opposite direction energizes said electrical drive means in the opposite sense, said second circuit means including an interrupting switch actuated by said electrical drive means, reversible power means for driving said power driven switch member in both directions, connection means for connecting said power means and said interrupting switch in series, and connection means for connecting said series combination in parallel with said electrical drive means, said power means including, a reversible electric motor, a reversible input power train, a ratchet mounting plate at least partially rotatable and driven through said reversible input power train by said electric motor, a ratchet wheel journaled coaxially with said ratchet mounting plate, a detent cooperating with said ratchet wheel, first and second ratchet levers pivotally mounted to said ratchet mounting plate and each having a tooth engageable with said ratchet wheel for effecting opposite unidirectional stepped movements of said ratchet wheel, spring means urging the tooth of each of said ratchet levers into engagement with said ratchet wheel, a drive pin on said ratchet mounting plate, stationary abutment means limiting movement in both directions of said drive pin, first and second actuating levers pivotally positioned to engage opposite sides of said drive pin, a stop pin disposed adjacent said levers and said abutment means, spring means urging said levers toward said pins, and means for coupling said power driven second member to said ratchet wheel.

12. A remote control system for rotating a shaft relative to a support, comprising drive means for rotating said shaft relative to said support, energization means, switch means connected to said drive means and having a first movable member and a power driven second member alignable with said first member whereby misalignment of said members effects rotation of said shaft by said drive means, power means for driving said power driven second member including a ratchet member, a ratchet lever having a tooth engageable with said ratchet member, a rotatable electric motor, a reversible input power train interconnecting said electric motor and said ratchet lever, said ratchet lever sliding over a tooth of said ratchet member upon drive of said ratchet lever from said electric motor, spring means acting on said ratchet lever to urge same in the direction opposite to the movement thereof effected by said electric motor to steppingly rotate said ratchet member, physical means for coupling said ratchet member to said power driven second member to drive same from said ratchet member, contact means carried on said second member, a first plurality of spaced electrical contacts mounted to be contacted by said contact means, a second plurality of spaced electrical contacts mounted to be contacted by said first movable member, a plurality of conductors interconnecting contacts of said first plurality with contacts of said second plurality, and circuit means connecting said energization means to said power unit and to said switch means.

13. A remote control system for rotating a shaft relative to a support, comprising drive means for rotating said shaft relative to said support, energization means for said drive means, and first and second circuit means, said first circuit means interconnecting said energization means and said electrical drive means and including means having a first movable member and a power driven second member alignable with said first member whereby alignment of said members de-energizes said first circuit means and misalignment of said members energizes said drive means, said second circuit means including an interrupting means actuated by said drive means, power means for driving said power driven second member, and connection means for connecting said power means and said interrupting means to said energization means, said power means including a ratchet member, a ratchet lever having a tooth engageable with said ratchet member for movement thereof, a rotatable electric motor, a reversible input power train interconnecting said electric motor and said ratchet lever, said ratchet lever sliding over a tooth of said ratchet member upon drive of said ratchet lever from said electric motor, spring means acting on said ratchet lever to urge same in the direction opposite to the movement thereof effected by said electric motor to steppingly rotate said ratchet member, physical means for coupling said power driven second member to said ratchet member, electrical contact means insulatively carried on said second member, a first plurality of spaced electrical contacts mounted to be contacted by said contact means, a second plurality of spaced electrical contacts mounted to be selectably contacted by said first movable member, and a plurality of conductors interconnecting contacts of said first plurality with contacts of said second plurality.

14. A remote control system for rotating a shaft relative to a support, comprising electrical drive means for rotating said shaft relative to said support, energization means for said electrical drive means, and first and second circuit means, said first circuit means interconnecting said energization means and said electrical drive means and including, switch means having a first movable member and a power driven second member electrically alignable with said first member whereby alignment of said members de-energizes said first circuit means and misalignment of said members causes rotation of said electrical drive means, said second circuit means including power means for driving said power driven switch member, and connection means for connecting said power means to said energization means, said power means including a movable ratchet member, a ratchet lever having a tooth engageable with said ratchet member for movement thereof, a rotatable electric motor, a reversible input power train interconnecting said electric motor and said ratchet lever, physical means for coupling said power driven second member to said ratchet member, contact means insulatively carried on said second member, a first plurality of spaced electrical contacts mounted to be contacted by said contact means, a second plurality of spaced electrical contacts mounted to be contacted by said first movable member of said switch means, and a plurality of conductors interconnecting the contacts of said first plurality with the contacts of said second plurality.

15. A remote control system for rotating a shaft relative to a support, comprising electrical drive means for rotating said shaft relative to said support, energization means for said electrical drive means, and first and second circuit means, said first circuit means interconnecting said energization means and said electrical drive means and including, multiple position switch means having a first rotatable member and a power driven second member electrically alignable with said first member whereby alignment of said members de-energizes said first circuit means and misalignment of said members energizes said electrical drive means, said second circuit means including an interrupting switch actuated by said electrical drive means, power means for driving said power driven second member, connection means for connecting said power means and said interrupting switch in series, and connection means for connecting said series combination to said energization means, said power means including a revoluble ratchet wheel, a ratchet lever having a tooth engageable with said ratchet wheel for rotation thereof in one direction, spring means urging said tooth into engagement with said ratchet wheel, a rotatable electric motor, a reversible input power train interconnecting said electric motor and said ratchet lever to steppingly ratchet said ratchet wheel in accordance with the rotation of said drive means, physical means for coupling said power driven second member to said ratchet wheel, an arcuate electrical contact insulatively carried on said second member, a first plurality of spaced electrical contacts mounted to be contacted by said arcuate contact, a second plurality of spaced electrical contacts mounted to be selectably and individually contacted by said first rotatable member of said switch means, and a plurality of conductors interconnecting each of the contacts of said first plurality with a different contact of said second plurality.

References Cited in the file of this patent

UNITED STATES PATENTS

| Number | Name | Date |
|---|---|---|
| 327,657 | Clarke | Oct. 6, 1885 |
| 835,382 | Willard | Nov. 6, 1906 |
| 999,947 | Barnum | Aug. 8, 1911 |
| 2,442,654 | Leland | June 1, 1948 |
| 2,488,259 | Armstrong | Nov. 15, 1948 |
| 2,533,398 | Pyle | Dec. 12, 1950 |